Patented May 14, 1940

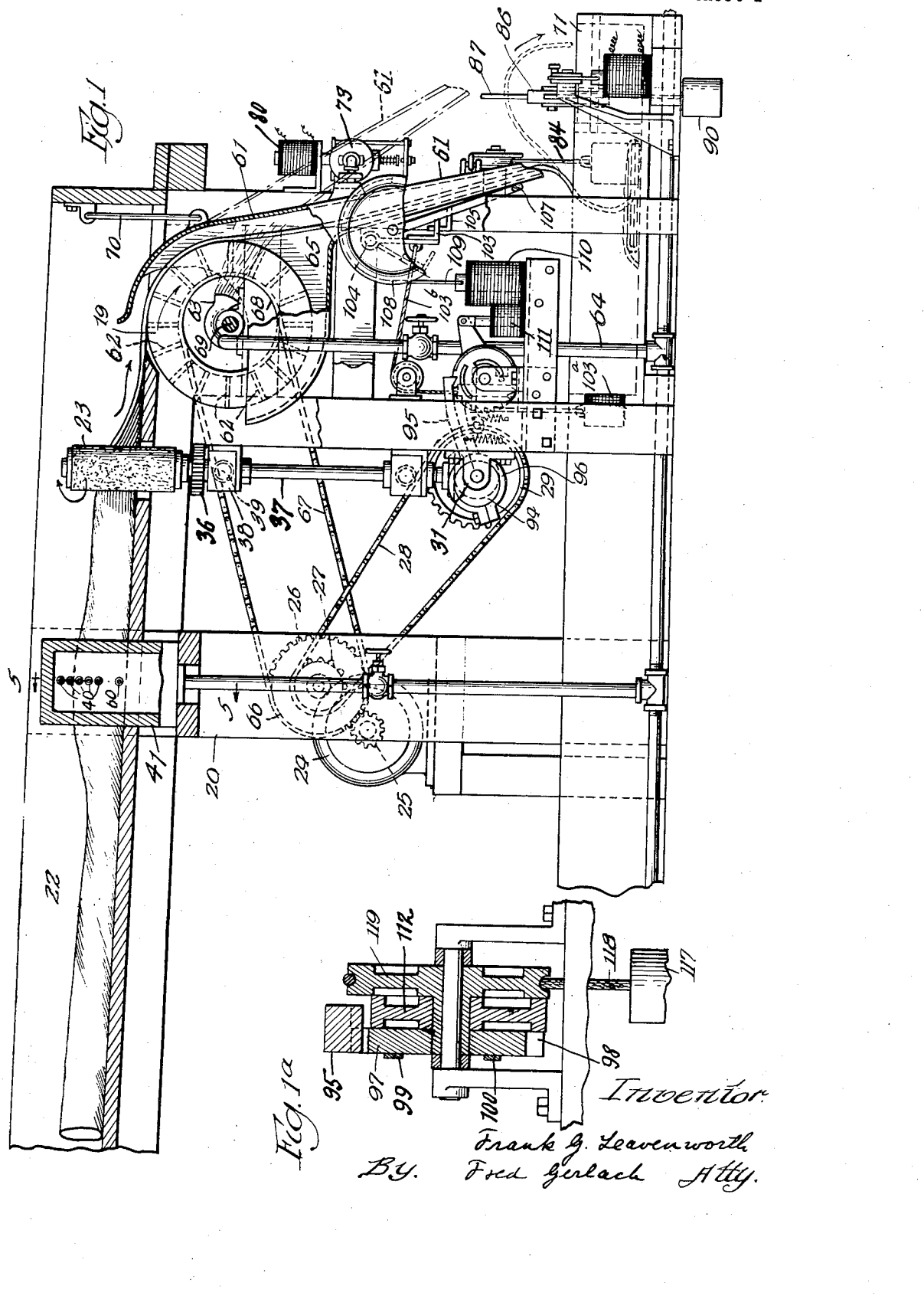

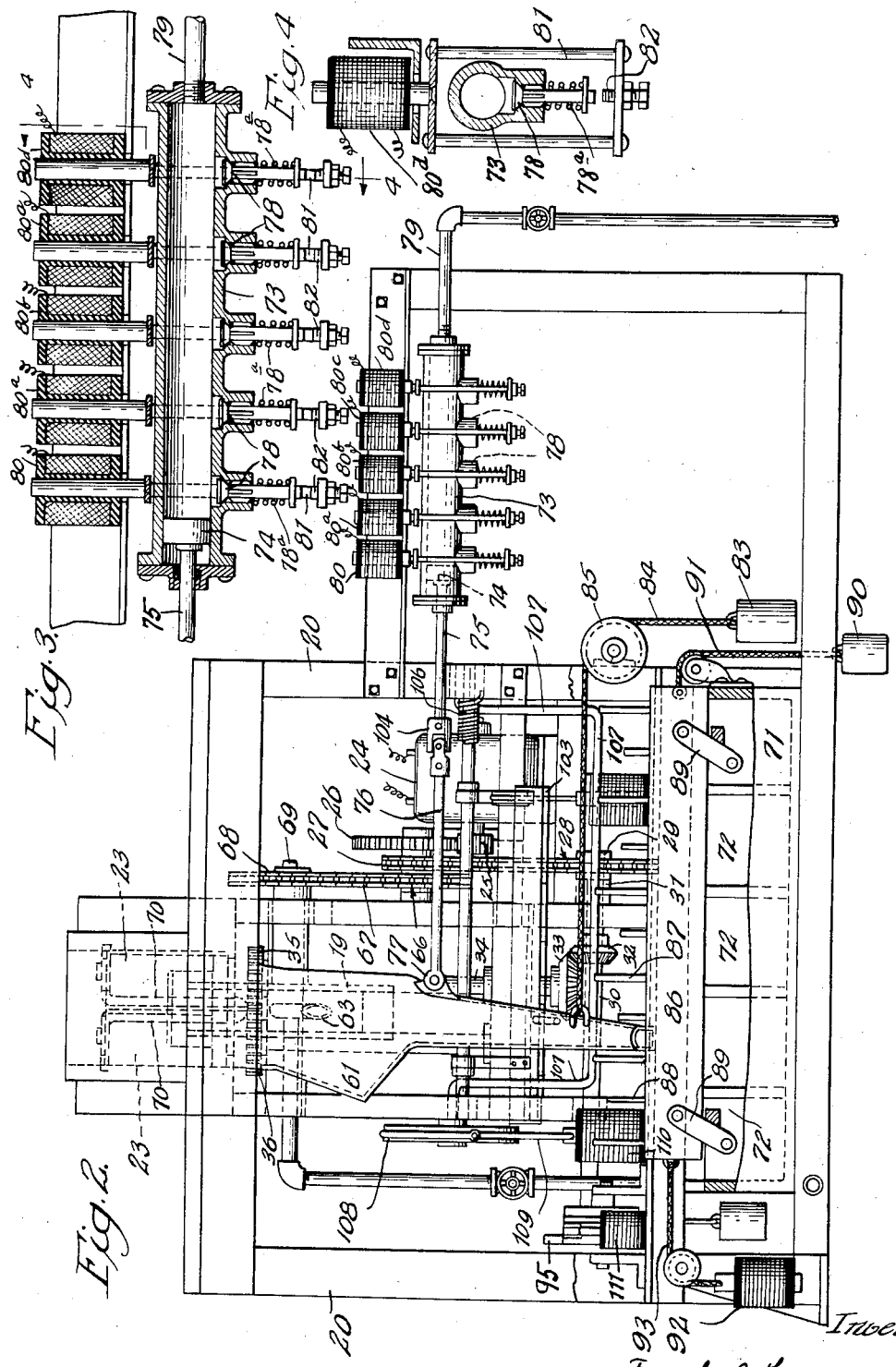

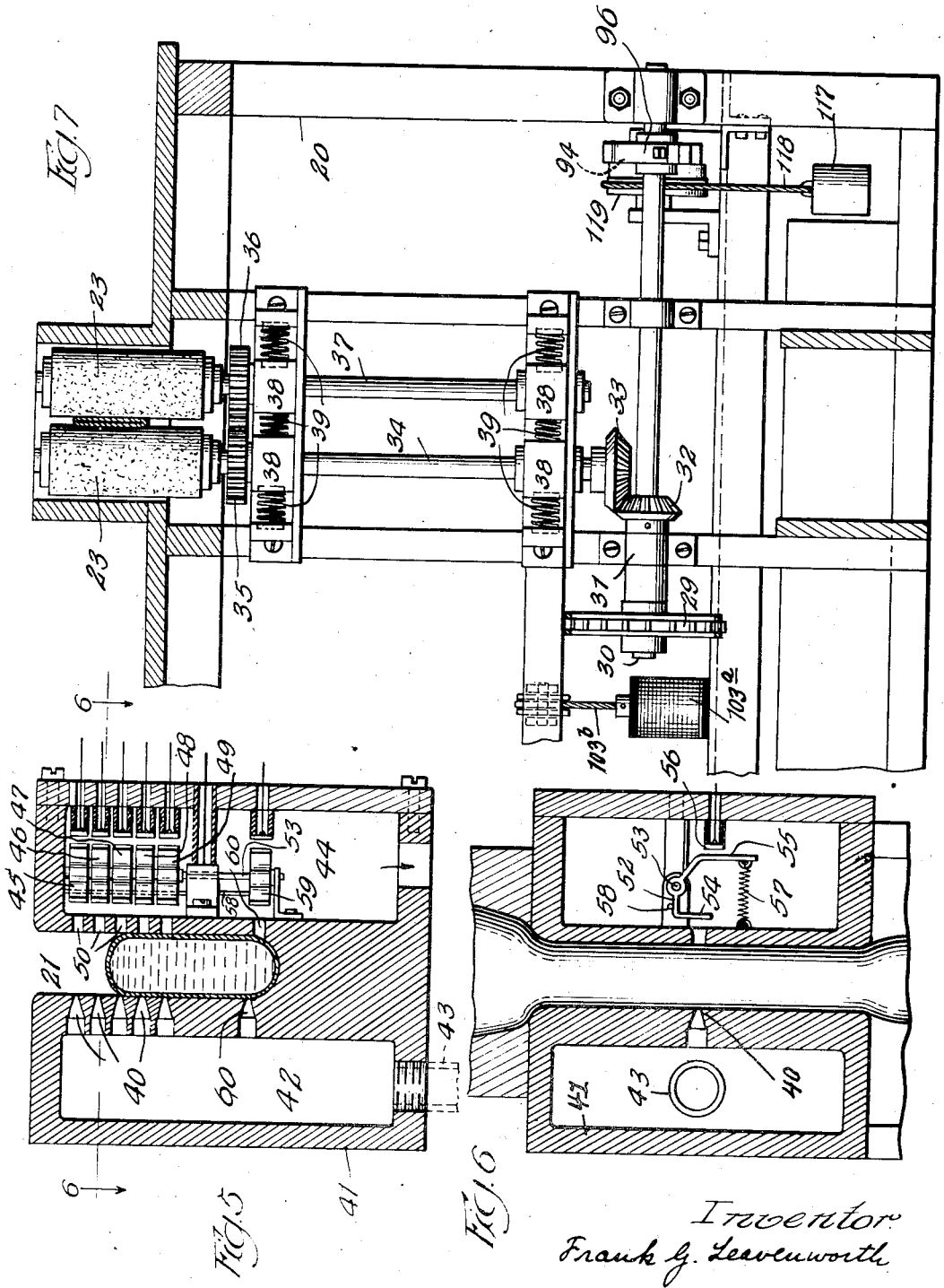

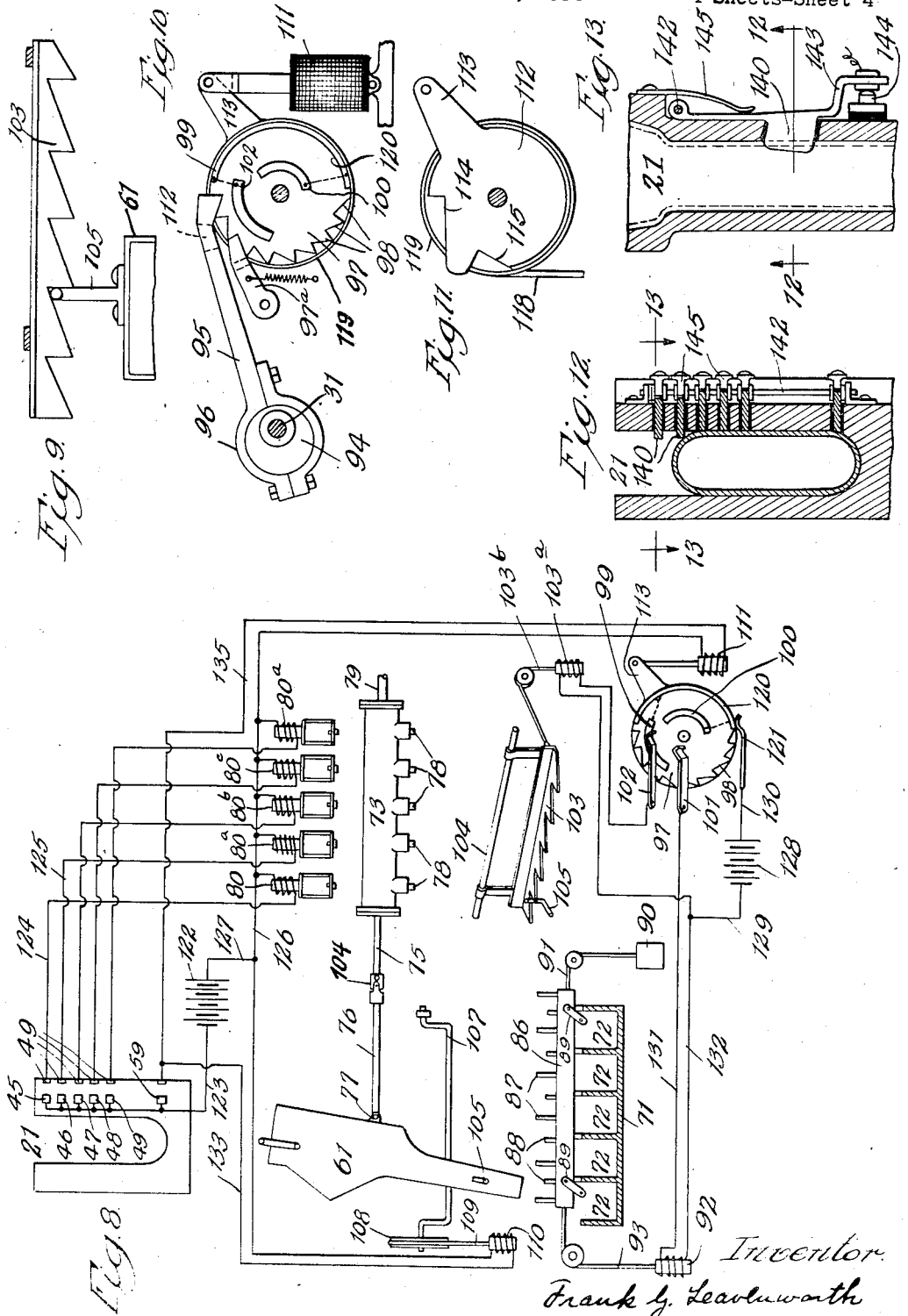

2,200,960

UNITED STATES PATENT OFFICE 2,200,960

DISTRIBUTING APPARATUS FOR INTESTINES

Frank G. Leavenworth, Oak Park, Ill., assignor, by mesne assignments, to Packers Machinery Company, Chicago, Ill., a corporation Application November 21, 1934, Serial No. 754,190

16 Claims. (Cl. 209—82)

The invention relates to improvements in measuring and distributing articles, such as animal intestines.

One object of the invention is to provide an improved apparatus for determining or measuring the diameter of intestines and sorting or distributing them according to their diameters. This object is attained primarily by the use of a series of switches for controlling distributing mechanism responsively to the diameter of the intestines.

Another object of the invention is to provide a series of jets of fluid under pressure for operating controlling switches for the distributing mechanism.

Another object of the invention is to provide improved apparatus for sorting or distributing intestines according to their diameters and for indicating their lengths.

Another object of the invention is to provide improved apparatus for measuring the diameters of intestines and automatically sorting or distributing them according to their diameters and their lengths.

Other objects of the invention will appear from the description.

The invention consists in the several novel features hereinafter set forth and more particularly defined by claims at the conclusion hereof.

In the drawings:

Fig. 1 is a side elevation, parts being shown in section, of apparatus embodying the invention. Fig. 1ª is a detail section through the switch member for controlling the placement of the ends of the intestines to indicate their lengths and the retraction of the distributing chute and the releasing device for said member. Fig. 2 is an end elevation, parts being shown in section. Fig. 3 is a longitudinal section of the fluid pressure controlled apparatus for shifting the distributing chute and the electromagnets for controlling the operation of said apparatus. Fig. 4 is a section on line 4—4 of Fig. 3. Fig. 5 is a vertical section taken on line 5—5 of Fig. 1. Fig. 6 is a horizontal section on line 6—6 of Fig. 5. Fig. 7 is a vertical section illustrating the feed and squeezing rolls and the driving mechanism therefor. Fig. 8 is a diagrammatic view illustrating the electrical connections for controlling the several parts of the apparatus. Fig. 9 is a detail of the ratchet bar and stop for holding the distributing chute in different positions. Fig. 10 is a detail of the switch member for controlling the placement of the rear ends of the intestines into different positions according to their lengths and the ratchet bar for holding the distributing chute against retraction. Fig. 11 is a detail of the releasing or trip device for causing said switch member to be restored to its normal position at the conclusion of a measuring and distributing operation. Fig. 12 is a horizontal section through the trough, through which the intestine passes showing another form of the invention. Fig. 13 is a section on line 13—13 of Fig. 12.

The invention is exemplified in apparatus which comprises a suitable supporting frame 20 upon which the measuring and distributing devices are mounted; a stationary trough 21 adapted to guide the intestine and contract it laterally and extend it vertically as it is moved longitudinally through the trough; a table 22 for supporting the intestine in transit to trough 21; a pair of rubber-covered feed and squeezing rolls 23 adapted to draw the intestine through the trough; a wheel 19 for drawing the intestine away from the feed rolls 23; and an electric motor 24 for driving said rolls 23 and wheel 19. The rolls 23 are driven from motor 24 through reduction gearing which comprises a pinion 25 on the motor shaft, a gear 26 meshing with said pinion, a sprocket wheel 27 rotating with gear 26, a sprocket chain 28 driven by a wheel 27, a sprocket wheel 29 driven by chain 28, a shaft 30 mounted in bearings 31 on the frame, a beveled gear 32 fixed to shaft 30 and a beveled gear 33 meshing with gear 32 and fixed to the lower end of the shaft 34 of one of the rolls 23. The other roll 23 is driven by a gear 35 fixed to shaft 34 and a gear 36 fixed to the shaft 37 of said other roll 23. Shafts 34 and 37 are mounted in laterally slidable bearings 38 to which springs 39 are applied to force the bearings together so the rolls 23 will squeeze the intestine between them. In order to measure the diameter of the intestine as it is fed through the trough 21, it is distended by filling a sufficient portion of its length with a suitable liquid, such as water. One end of the intestine is then held closed or tied and placed into the bite of the feed rolls 23. These rolls squeeze the intestine so that the water therein will be forced to travel backwardly in the intestine as the latter is fed forwardly by the feed rolls. The width of the trough 21 is narrower than the diameter of the intestines handled, so that they will be contracted horizontally and extended vertically while passing through the trough. When the intestine is thus distended and confined in the trough, variations in its diameter will proportionately vary its height as it passes through the trough 21 wherein it is confined against lateral movement.

The invention contemplates distributing the intestines according to their diameters under control of a series of hydraulic jets disposed to project streams across the trough upon the intestine to operate a series of electrical switches for controlling the operation of the distributing means for the intestines and interrupting the streams by the intestine passing through the trough, so the number of switches operated will be varied according to the diameter of the intestine. For this purpose, a vertical series of jets 40 is arranged in one side of the trough 21 which is formed in a water box 41. The top of the trough is open to permit the leading end of the intestine to be placed therein. This box is provided with a chamber 42 to which water is supplied under constant pressure through a supply pipe 43. At the opposite side of box 41 a chamber 44 is provided, which contains a series of electrical switches 45, 46, 47, 48 and 49, which are respectively adapted to be operated by streams of water from the jets 40 directed through openings 50 in one side of the trough. A distended intestine passes through the trough 21, will permit one or a number of the streams from the jets 40 to pass over the intestine and through holes 50 to shift the switches, according to the height of the intestine or its diameter, and all of the jets below the top of the intestine will be obstructed by the intestine to prevent the actuation of the remaining switches. This series of switches controls the distribution of the intestine, as hereinafter set forth. Each of these switches comprises a member 52 which is pivotally supported at 53, an arm 54 in the path of a stream from its associated hole 50 and an arm 55 which is adapted to engage a stationary contact 56 to close a circuit when the member is shifted by a stream of water. A light or sensitive spring 57 is applied to each member 52 to normally hold the member against a stop 58, so that arm 55 will be disengaged from contact 56, except when the member is shifted by a stream of water. A similar switch 59 is provided adjacent the bottom of the trough 21 and is operable by a stream from a water jet 60. This jet is adapted to operate switch 59 to control circuits hereinafter described as the trailing end of the intestine passes through the trough 21. This exemplifies a series of hydraulic jets for operating a series of switches for controlling the distribution of the intestines according to their diameters.

Ths wheel 19 is located beyond the feed rolls 23 to draw the intestines from the feed rolls and deliver them into a distributing chute 61. Wheel 19 consists of sides with intermediate vanes 62. The vanes exert sufficient pull on the intestines to direct them downwardly into the chute 61. A constant stream of water is supplied through a pipe 64 to a nozzle 63 which discharges the water against a portion of the intestine engaging the wheel to prevent the intestine from rotating with said wheel. A trough 65 is formed on the chute 61 around the upper portion of the wheel 19 to receive the water discharged from the spout 63 and direct it downwardly through the chute 61 to prevent the intestine from adhering to the chute and insure its downward passage therethrough. The wheel 19 is driven by a sprocket wheel 66 which is fixed to rotate with gear 26, a chain 67 and a sprocket wheel 68 on the shaft 69, to which wheel 19 is fixed. This exemplifies means for drawing the intestine from the rolls after it has been measured and discharging it through the distributing chute 61, with means for flowing water through the chute to facilitate the travel of the intestines.

The upper end of the chute 61 is pivotally suspended by a link 70, which permits the lower end of the chute to be swung transversely to deliver the intestines into a suitable receiver 71. This receiver is provided with compartments 72, one for each predetermined diameter for which the apparatus is designed, into which intestines of different diameters are sorted or distributed according to their diameters. The apparatus for shifting the distributing chute 61 to direct the intestines into the different compartments 72, according to their diameters, which is controlled by the switches 45, 46, 47, 48 and 49, and the streams of water from jets 40, comprises a hydraulic cylinder 73, a piston 74, slidable in the cylinder and fixed to a stem 75, which is connected by a link 76 at 77 to the chute 61, a series of valves 78 which control the outflow of water entering, through pipe 79, at one end of cylinder 73, and a series of electromagnets 80, 80$^a$, 80$^b$ 80$^c$ and 80$^d$ which are controlled by the jet-operated switches adjacent the trough 21 and are adapted to respectively open the valves 78. Valves are normally closed by springs 78$^a$. The pressure of water in the cylinder 73 normally forces the piston 74 to the left. Each of said series of magnets has attached to its armature a depending yoke 81 which is provided with a screw 82 for engaging the lower end of the stem of its associated valve to lift the valve and permit water to escape from cylinder 73 at the point where the valve is located. When magnet 80 is energized, it will lift the first valve 78 to allow water to escape from the cylinder 73 until the valve is closed by the piston 74. As the remaining magnets of the series are successively operated, the associated valves are opened to permit the piston 74 to correspondingly move to the right and correspondingly shift the chute 61 step-by-step and responsively to the number of streams which operate the switches for the magnets and according to the diameter of the intestine. As the piston moves to the right, stem 75 and link 76 will shift the chute 61 to cause the intestines to be deposited into the compartments 72 according to their diameters. A weight 83 attached to a cable 84 guided around a sheave 85, is applied to the chute 61 to normally shift, through link 76 and stem 75, the piston 74 to the right as the water pressure is released in the cylinder 73, to cause the piston to move to the right as the valves 78 are successively opened responsively to the diameter of the intestine.

When an intestine laid in and passing through trough 21 is of the maximum diameter for which the apparatus is designed, all of the jets 40 will be interrupted by the intestine and consequently all of the magnetically controlled valves 78 in cylinder 73 will be closed and the chute 61 will remain positioned to discharge the intestine in the left-hand compartment 72 of the receiver 71. When the intestine laid in and passing through trough 21 is sufficiently smaller in diameter to be graded as one of next smaller diameter, the uppermost jet 40 will clear the top of the intestine and be projected across the trough and impacted against the switch 45 to close the circuit at contact 49 through magnet 80. This magnet will then be opened to permit the outflow of water from cylinder 73 until the piston 74 passes over the open valve 78 and prevents further outflow of water from the cylinder. This movement of the piston 74 will shift the chute 61 to bring it into position to deliver the intestine into the next compartment 72 of the receiver. Correspondingly, intestines of progressively smaller diameter will clear additional jets of the series to permit a number of the jet-operated switches to be operated according to the diameters of different casings. This apparatus exemplifies means controlled by a series of electromagnets for swinging the chute 61 to sort the intestines in the compartments 72 according to their diameters.

Usually, intestines have portions of relatively different diameters and are graded according to their maximum diameters. A device is provided for holding the chute 61 in the position in which it is shifted at the commencement of a distributing operation and when the intestine is laid in the trough 21 to prevent the chute from being shifted to sort the intestine according to any decrease in diameter and to permit the chute to be shifted in the event that the remaining portion of the intestine is of larger diameter so the intestine will be graded according to its largest diameter. This device comprises a transversely extending ratchet bar 103 which is fixed to rod 104 which is pivotally mounted in the supporting frame 20, and an abutment 105 fixed to the chute 61. The ratchet bar 103 is hung so that it will rest against the abutment 105 by gravity. A magnet 103ª is connected by a cable 103ᵇ to the ratchet bar 103 to disengage it from abutment 105 on the chute when the chute is to be restored to its normal position. The teeth on bar 103 permit the chute to swing to the left responsively to an increase in the diameter of the intestine but prevent the chute from moving to the right responsively to a decrease in the diameter.

In some instances it is desirable, also, to differentiate intestines of the same diameter according to predetermined lengths. For this purpose, the invention provides mechanism for placing the trailing end of the intestine in one position when it is of a short length and into another position when it is of greater predetermined length, so that the operator in removing the intestines from the compartments 72 can, from the position of the ends of the intestines, separately remove the long intestines and the short intestines. The chute 61 is suspended on link 70 so it can swing longitudinally in addition to the transverse swinging to distribute the intestines into the compartments 72. The chute 61, when swung longitudinally, will deflect the trailing end of each intestine over a bar 86 which is provided with high upstanding pins 87 spaced according to the partitions between the compartments and intermediate short pins 88. Bar 86 is mounted on a pair of parallel links 89 which permit the transverse movement of the bar. Bar 86 is movable transversely into two positions, so that in one of its positions the trailing ends of the intestines will be deflected, by chute 61, over the bar and at one side of the pins 88, and in its other position, the intestines will be deflected over the bar at the other side of the pins 88, so that the ends of all of the short intestines will be lapped over the bar 86 at one side of pins 88 and the long intestines will be lapped over the bar at the other side of said pins.

The mechanism for shifting the bar 86 between its alternative positions comprises a weight 90 which is connected to a cable 91 which is attached to one end of bar 86 and normally holds the bar in position to cause the chute 61 to lap the ends of short intestines over the bar at one side of pins 88, and an electromagnet 92 which is connected by a cable 93 to the other end of bar 86 to shift the bar in its other alternative position, so that the chute 61 will lap the ends of long casings over the bar at the other side of pins 88.

The mechanism for swinging the chute 61 longitudinally to cause its lower end to swing and lap the end of a casing over the bar 86 comprises a bail 107, the upper end of which is pivoted in the supporting frame 20, a pulley 108 fixed to the pivot of the bail, a cable 109 having one of its ends fixed to the pulley, and an electromagnet 110 for operating the cable 109 to rotate pulley 108 and bail 107. The chute 61 is retracted by gravity when the magnet 110 is deenergized.

The mechanism for controlling the magnets 92 and 103ª comprises switch member 97 and mechanism for stepping up said member. The mechanism for shifting member 97 comprises an eccentric 94 secured to rotate with the motor-driven shaft 30, a pawl 95 operated by a band 96 on the eccentric 94, for engaging ratchet teeth 98 on switch member 97 a number of steps corresponding to the number of revolutions of the eccentric 94 made during the transit of a casing through the trough 21, a peripheral contact strip 120 on member 97 engaged by a stationary contact 121 and arcuate switch contact 99 on member 97 engaged by a stationary contact 102, which control a circuit through the magnet 103ª, and an arcuate contact 100 on member 97 engaged by a stationary contact 101 to control a circuit through magnet 92. A dog 97ª holds the member 97 in its stepped up position.

During the rotations of the eccentric 94 occurring while a short casing is passing through the trough 21, the bar 86 will remain in the normal position in which it is held by weight 90 so that the chute 61 will lap the intestines over bar 86 at one side of pins 88. While a long casing is passing through the trough 21, the eccentric 94 will revolve a sufficient number of revolutions to operate pawl 95 the necessary number of strokes to shift switch member 97 to establish a circuit through contacts 100, 101 and magnet 92 to shift bar 86 against the force of weight 90 and into position to cause the chute 61 to lap the ends of the long casings over the bar at the other side of pins 88. Thus, the ends of all the short intestines deposited in each compartment will be grouped together and the ends of long intestines will be separately grouped.

At the end of each distributing operation it is necessary to release the ratchet bar 103 from the chute 61 so the latter may be moved to its normal position. Contact 99 on switch member 97 is positioned and of such arcuate length that normally it will close a circuit through magnet 103ª and hold the ratchet bar 103 disengaged from abutment 105 on chute 61 until sufficient of the leading portion of the intestine has passed through trough 21 for measuring the diameter of the intestine and setting the chute 61 accordingly and, during the remainder of each operation, contact 99 will be disengaged from contact 102 so that magnet 103ª will be deenergized to permit the ratchet bar 103 to prevent retraction of the chute 61.

The trailing end of the intestine is lapped over the bar 86 in a position according to its length, after the intestine has passed through trough 21.

The distributer chute 61, bar 86, and the stepped-up switch member 97 are restored to their normal position in readiness for the next casing placed in the trough 21 at the completion of the operation on the preceding intestine. For this purpose switch 59 is positioned adjacent the bottom of the trough 21 and is operable by a stream of water from the jet 60 after the trailing end of each intestine has passed through the trough. This switch 59 controls the circuit through the magnet 110 which operates the chute 61 longitudinally to lap the end of the casing over the bar 86 and also controls the circuit through magnet 111 which operates a releasing member 112 for the stepped-up switch member 97. Said releasing member 112 is provided with an arm 113 to which is connected the armature of magnet 111 and with abutment 114 adapted to lift the pawl 95 to disengage it from the ratchet teeth 98 on member 97, and an abutment 115 to lift dog 97ª. A weight 117 on a cable 118 is applied to a wheel 119 which is fixed to the switch member 97 for retracting the switch member 97 to its normal position when the magnet 111 is energized as the result of closing switch 59. When the switch member 97 returns to its normal position, the circuit through magnet 92, if it has been energized to shift bar 86, will be broken at contacts 100, 101, to permit the bar to be retracted to its normal position by weight 83.

The operation is as follows: Assuming the motor 24 to be running, the operator will place one end of an intestine which has been distended with water into the bite of feed and squeezing rolls 23, which will draw the intestine through the trough and force the water in the intestine backwardly as the intestine passes through the trough. The leading end of the intestine will pass over wheel 19 and downwardly through the chute 61. A stream of water from nozzle 63 releases the intestine from the wheel and causes it to travel downwardly through the lower end of the trough. When the distended intestine is placed in the trough 21 streams will be projected across the trough above the intestine from all jets 40 above the intestine and through holes 50 to the associated switches, in number depending upon the height or diameter of the intestine. The streams from the remaining jets will be interrupted by the intestine so that the remaining associated switches will not be shifted. Assuming that an intestine has been placed in the trough 21 with a diameter sufficient to permit two streams from the two upper jets 40 to be projected across the trough, switches 45 and 46 will be operated to close circuits at their associated contacts 56. This will establish circuits through magnets 80 and 80ª as follows: battery 122, conductor 123, switch 45, conductor 124, magnet 80, and also through switch 46, conductor 125, magnet 80ª, conductors 126 and 127, to battery 122. Magnets 80 and 80ª will open the associated valves 78 and permit the water to escape from cylinder 73 until the piston 74 stops the flow of water through both of said valves. The weight 83 applied to the chute 61 will, through link 76 and piston stem 75, cause the piston 74 to move to the right until the flow of water to the last open valve has been stopped by the piston. The chute 61 will be correspondingly set to direct the intestine in the compartment 72 of receiver 71 for intestines of the corresponding diameter. The eccentric 94 will commence, as soon as switch 59 is opened and releases the releasing member 112 for switch member 97, to step up said switch member.

During a predetermined period after the commencement of each operation, magnet 103ª will be energized by a circuit from battery 128, conductor 130, contacts 121, 120, contacts 99, 102, magnet 103ª which is included in the contact 102 and a conductor 129 to battery 128. After a sufficient period has elapsed for the measuring of the intestines and the responsive setting of the chute 61 thereto, said circuit will be interrupted at contacts 99, 102, whereupon magnet 103ª will be deenergized to release the ratchet bar 103 so it will hold the chute against movement responsively to any decrease in the diameter of the remaining portion of the casing. The eccentric 94 will step up the switch member 97 a number of steps varying according to the length of the intestine. If the intestine is greater than a predetermined length, the switch member 97 will, by reason of the greater number of revolutions of eccentric 94 and corresponding number of steps imparted to switch member 97 by pawl 95, shift the switch member 97 to bring contact 100 into engagement with contact 101 on said member. This will establish a circuit for shifting the bar 86 to bring it into position so the end of the intestine will be lapped thereover at one side of pins 86, said circuit being as follows: battery 128, conductor 130, contacts 121, 120, 100, 101, conductor 131, magnet 92, conductors 132, 129, to battery 128. When magnet 92 is energized it will operate cable 93 against the force of weight 83 and shift bar 86 into the position to cause the chute 61 to lap the intestine over the bar according to its length. When the trailing end of the intestine reaches the trough and clears the jet 60, the stream from that jet will close switch 59. This will establish a circuit for swinging the chute 61 longitudinally to lap the end of the intestine over bar 86 and through magnet 110, said circuit being as follows: battery 122, conductor 123, switch 59, conductor 133, in which magnet 110 is included, and conductor 127, to said battery. Magnet 110 will operate cable 109 and pulley 108 to rock the bail 107 which will engage and swing the chute 61 longitudinally so the end of the intestine will be lapped over the bar 86, as indicated by dotted lines in Fig. 1. A circuit will also be established for operating releasing member 112 to release the switch member 97 to its normal position, which circuit will be as follows: battery 122, conductor 123, switch 59, conductor 135, in which magnet 111 is included, conductors 126 and 127, to battery 122. Magnet 111 will then shift the releasing member 112 to disengage pawl 95 and dog 97ª from the ratchet teeth on switch member 97 and permit the weight 117 to retract the switch member to its normal position. The circuit for magnet 92 will then be interrupted at contacts 101, 100 to permit the weight 90 to retract the bar 86 to its normal position. When all the switches associated with the trough 21 are open after one intestine has been measured and distributed, the valves 78 in cylinder 73 will be open. When the next intestine is placed in the trough, switch 59 and a number of jet-operable switches associated with the trough, will be opened as the result of the interruption of the streams from the water jets, in number responsive to the diameter of the distended intestine in the trough. As the valves 78 are closed, the water entering the cylinder 73 will force the piston 74 to the left until an open valve 78 is encountered, whereupon the movement of the piston will be arrested and the chute 61 will be correspondingly positioned to distribute the intestine into one of the compartments 72 according to its diameter and the operations will be repeated as previously described.

In the modified form of the invention illustrated in Figs. 12 and 13, the series of switches for controlling the magnetically operated valves for the hydraulic mechanism for operating the distributing chute 61, are operated by direct contact with one side of the intestine as it passes through the trough 21, in lieu of being operated by hydraulic jets. Each switch for one of the valve operating magnets comprises a contact shoe 140 on a switch member 141, which is pivotally supported at 142 and has an arm 143 adapted to engage a stationary contact 144. A light spring 145 is provided to normally hold the shoe 140 in the path of the intestine. In this form of the invention all of the switch levers 141 which are engaged by the intestine as it passes through the trough will be held open by the pressure of the intestine against its shoe 140 and the shoes above the intestine will be free to retain open the circuit controlled thereby. The switches are connected to and are operable with the distributor mechanism previously described in the same manner.

The invention exemplifies means for sorting or distributing the intestines, which comprises a series of switches which are operated responsively to variations in the diameter of the intestines. Also, means for measuring and distributing the casing, which comprises switches for controlling the movements of the distributing device which are operated by the hydraulic jets. Also, mechanism for sorting the trailing ends of intestines according to the lengths of the intestines.

The invention is not to be understood as restricted to the particular details set forth, since these may be modified within the scope of the appended claims, without departing from the spirit and scope of the invention.

What I claim as new and desire to secure by Letters Patent is:

1. In apparatus of the character described, the combination of a trough, means for moving an intestine through the trough, a series of electric switches, distributing means for the intestines, fluid pressure means for shifting the distributing means, controlled by said switches, and means for operating said switches, in varying number according to the diameter of the intestine.

2. In apparatus of the character described, the combination of a trough, means for moving an imperforate intestine through the trough, a plurality of switches, distributing means for the intestine controlled by the switches, and fluid pressure means for projecting a stream of fluid against and over the intestines to operate said switches according to the diameter of the intestine.

3. In apparatus of the character described, the combination of a trough, means for moving an intestine through the trough, a plurality of switches, distributing means for the intestine controlled by the switches, and means for projecting a transverse stream of water against and above the intestine to operate said switches according to the diameter of the intestine.

4. In apparatus of the character described, the combination of a trough, means for moving an intestine through the trough, a plurality of switches, electro-magnets controlled by the switches, distributing means for the intestine, controlled by the electromagnets, and fluid pressure means for projecting a stream of fluid against and over the intestines according to the diameter of the intestine.

5. In apparatus of the character described, the combination of a trough, means for moving an intestine through the trough, a plurality of switches, distributing means for the intestine, fluid pressure means for operating the distributing means, controlled by the switches, and fluid pressure means for projecting a stream of fluid against and over the intestines according to the diameters of the intestine.

6. In apparatus of the character described, the combination of a trough, means for moving an intestine through the trough, means for distributing the intestines according to their diameters, comprising a movable chute, electrical means responsive to the diameters of the intestines for controlling the distributing movement of the chute, and means controlled by the ends of the intestines for shifting the chute to place the ends of the intestines.

7. In apparatus of the character described, the combination of a trough, means for moving an intestine through the trough, means for measuring one of the dimensions of the intestine, and mechanism for distributing the intestines according to their size, comprising means for variably placing the trailing ends of the intestines according to variations in said dimensions.

8. In apparatus of the character described, the combination of a trough, means for moving an intestine through the trough, mechanism for distributing the intestines according to their diameters, and means for separately placing the trailing ends of the intestines according to their lengths.

9. In apparatus of the character described, the combination of a trough, means for moving an intestine through the trough, mechanism for distributing the intestines according to their diameters, and electromagnetically controlled means for separately placing the trailing ends of the intestines according to their lengths.

10. In apparatus of the character described, the combination of a trough, means for moving an intestine through the trough, mechanism for distributing the intestines according to their diameters, comprising a movable chute and means for differentially shifting the chute to place the trailing ends of the intestines according to their lengths.

11. In apparatus of the character described, the combination of a trough, means for moving an intestine through the trough, distributing mechanism for the intestines comprising a chute and compartments into which intestines of different diameters are responsively delivered through the chute, means, responsive to the diameters of the intestines, for controlling the movements of the chute between the compartments, and means for differentially shifting the chute to place the trailing ends of intestines.

12. In apparatus of the character described, the combination of a trough, means for moving an intestine through the trough, distributing mechanism for the intestines comprising a chute and compartments into which intestines of different diameters are responsively delivered through the chute, means, responsive to the diameters of the intestines, for controlling the movement of the chute between the compartments, and electromagnetically controlled means for differentially shifting the chute to place the trailing ends of intestines.

13. In apparatus of the character described, the combination of means for feeding an intestine, a chute, means for conducting the intestines through the chute, comprising a wheel and means for delivering a stream of water into the chute, and means for operating the chute to distribute the intestines responsively to variations in their diameters.

14. In apparatus of the character described, the combination of means for feeding an intestine, a distributing chute, means for conducting the intestines to the chute, comprising a wheel and means for delivering a stream of water to the wheel and the intestines thereon, and discharging into the chute, and means for operating the chute to distribute the intestines responsively to variations in their diameters.

15. In apparatus of the character described, the combination of a trough provided with means for flattening a distended intestine, means for positively advancing the intestine through the trough, a series of electrical switches, and means for operating the switches in varying number according to the diametrical measurement of the intestine where the intestine is flattened in the trough.

16. In apparatus of the character described, the combination of a trough provided with means for flattening a distended intestine, means for positively advancing the intestine through the trough, a series of electrical switches, means for operating the switches in varying number according to the diametrical measurement of the intestine where the intestine is flattened in the trough, and means for distributing the intestine controlled by the switches according to said measurements of the intestine.

FRANK G. LEAVENWORTH.